(12) United States Patent
Shende (10) Patent No.: US 10,436,099 B2
(45) Date of Patent: Oct. 8, 2019

(54) EXHAUST CONDUIT HANGER

(71) Applicant: Tenneco Automotive Operating Company Inc., Lake Forest, IL (US)

(72) Inventor: Devdutt Shende, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 15/480,776

(22) Filed: Apr. 6, 2017

(65) Prior Publication Data
US 2018/0291793 A1    Oct. 11, 2018

(51) Int. Cl.
| F01N 13/18 | (2010.01) |
| F16B 2/22 | (2006.01) |
| F16B 7/04 | (2006.01) |
| F16B 2/24 | (2006.01) |
| F16B 17/00 | (2006.01) |

(52) U.S. Cl.
CPC ..... *F01N 13/1805* (2013.01); *F01N 13/1822* (2013.01); *F16B 2/22* (2013.01); *F16B 2/245* (2013.01); *F16B 7/04* (2013.01); *F16B 17/004* (2013.01); *F01N 2450/18* (2013.01)

(58) Field of Classification Search
CPC ........ F01N 13/1805; F01N 13/08; F16B 2/22; F16B 7/04; F16B 2/20; F16B 2/246
USPC ..................... 248/74.2, 218.4, 219.2, 219.3
See application file for complete search history.

(56) References Cited

U.S. PATENT DOCUMENTS

| 1,838,249 | A | 12/1931 | Brown |
| 3,196,905 | A | 7/1965 | Hills |
| 3,508,731 | A * | 4/1970 | Jablonski ............. F21V 21/116 248/219.2 |
| 3,593,750 | A | 7/1971 | Zautner |
| 3,653,696 | A | 4/1972 | Cassel |
| 3,941,041 | A | 3/1976 | Sprout |
| 3,942,599 | A | 3/1976 | Shimada |
| 4,114,715 | A | 9/1978 | Theron |
| 4,116,411 | A | 9/1978 | Masuda |
| 4,209,155 | A | 6/1980 | Florian |
| 4,257,155 | A | 3/1981 | Hunter |
| 4,629,226 | A | 12/1986 | Cassel et al. |
| 4,638,965 | A | 1/1987 | De Bruine et al. |
| 4,824,056 | A | 4/1989 | Wuebker et al. |
| 5,216,883 | A | 6/1993 | Flugger |

(Continued)

FOREIGN PATENT DOCUMENTS

| CN | 202832732 U | 3/2013 |
| DE | 9106174 U1 | 7/1991 |

(Continued)

*Primary Examiner* — Nkeisha Smith
(74) *Attorney, Agent, or Firm* — Harness, Dickey & Pierce, P.L.C.

(57) ABSTRACT

An exhaust hanger assembly for a vehicle includes a bracket, a clip, and a rod. The bracket includes a peripheral wall having a non-circular cross section. The bracket includes a first end configured to be fixed to an exhaust pipe of the vehicle and a second end including first and second receivers formed in peripheral wall. The clip is disposed around at least a portion of an outer surface of the bracket and fixed to the bracket. The clip includes opposing apertures. The rod, which is configured to be fixed to a body of the vehicle, extends through the opposing apertures of the clip and is fixed to the clip. The rod is disposed within the first and second receivers of the bracket.

20 Claims, 7 Drawing Sheets

(56) References Cited

U.S. PATENT DOCUMENTS

| | | | |
|---|---|---|---|
| 5,472,162 A * | 12/1995 | Mason | G09F 15/0062 |
| | | | 248/121 |
| 5,649,685 A | 7/1997 | Keller | |
| 5,761,905 A | 6/1998 | Yamada et al. | |
| 5,890,685 A | 4/1999 | Takahashi | |
| 5,908,187 A | 6/1999 | Kalkoske et al. | |
| 6,402,119 B1 | 6/2002 | Miska | |
| 6,758,300 B2 | 7/2004 | Kromis et al. | |
| 6,942,838 B1 | 9/2005 | Morishita | |
| 7,478,700 B2 | 1/2009 | Connelly | |
| 7,571,880 B2 | 8/2009 | Perez | |
| 7,624,956 B2 | 12/2009 | Steigert et al. | |
| 7,678,168 B2 | 3/2010 | Connelly et al. | |
| 7,753,335 B2 | 7/2010 | Ogimura | |
| 8,109,475 B2 | 2/2012 | Kerchner | |
| 8,690,115 B2 | 4/2014 | Rodecker et al. | |
| 9,371,849 B2 * | 6/2016 | Schaaf | F16B 7/0446 |
| 9,625,059 B2 * | 4/2017 | Meister | E04B 9/16 |
| 2002/0113173 A1 | 8/2002 | Bass | |
| 2004/0262460 A1 * | 12/2004 | Molnar | B60K 13/04 |
| | | | 248/60 |
| 2005/0184201 A1 | 8/2005 | Komitsu et al. | |
| 2005/0264012 A1 | 12/2005 | Ignaczak et al. | |
| 2006/0042856 A1 | 3/2006 | Kim et al. | |
| 2006/0103135 A1 | 5/2006 | Scott | |
| 2006/0213566 A1 | 9/2006 | Johnson | |
| 2006/0261594 A1 | 11/2006 | Gerard | |
| 2008/0142647 A1 | 6/2008 | Connelly et al. | |
| 2008/0191117 A1 | 8/2008 | Steinmaier et al. | |
| 2009/0107944 A1 * | 4/2009 | Goldberg | A47B 57/48 |
| | | | 211/192 |
| 2013/0056589 A1 | 3/2013 | Lampe et al. | |
| 2013/0221813 A1 * | 8/2013 | Maisch | H02B 1/01 |
| | | | 312/107 |
| 2014/0291983 A1 | 10/2014 | Tanaka et al. | |
| 2016/0069247 A1 | 3/2016 | Rodecker | |

FOREIGN PATENT DOCUMENTS

| | | |
|---|---|---|
| FR | 2874651 A1 | 3/2006 |
| FR | 2919340 A1 | 1/2009 |
| GB | 1090200 A | 11/1967 |
| JP | H09228833 A | 9/1997 |
| JP | H11342753 A | 12/1999 |
| JP | 2007153277 A | 6/2007 |
| JP | 2008037293 A | 2/2008 |
| JP | 2010138784 A | 6/2010 |
| KR | 100312346 B1 | 11/2001 |
| KR | 20120009168 A | 2/2012 |
| WO | WO-2009118746 A1 | 10/2009 |

* cited by examiner

EXHAUST CONDUIT HANGER

FIELD

The present disclosure relates to vehicle exhaust assemblies and the interconnection between the vehicle exhaust assembly and the vehicle body.

BACKGROUND

This section provides background information related to the present disclosure which is not necessarily prior art.

Many vehicles are equipped with structures identified as exhaust hangers for fixing exhaust systems to a vehicle body or frame. Some exhaust hangers include a flexible element, such as a rubber or silicone isolator. The exhaust hanger may include a straight portion extending from the flexible isolator called a perch. The perch is the loading point for the hanger assembly. The perch may be a hollow or solid rod that can be bent into required shapes. Several exhaust hangers may be distributed along the length of an exhaust, increasing cost and complexity of the system. Exhaust hangers having longer perches may suffer from poor noise, vibration and harshness (NVH) performance.

There is an increasing desire for vehicles having improved NVH refinement, i.e., higher first mode frequency, and reduced mass while maintaining acceptable durability performance. Thus, other exhaust hangers may include a bracket, which may have a triangular cross section, attached to the exhaust, and a rod attached to the bracket for fixing the exhaust to the vehicle body or frame. Rod and bracket hangers may be used when it is necessary to meet high frequency targets. Rod and bracket hangers may require a unique design for each location. The need for multiple designs can thereby increase cost and complexity.

While previously implemented exhaust hangers may have satisfactorily functioned in the past, strides may be made to reduce mass, increase durability, reduce NVH characteristics, and improve ease of manufacturing and assembly. Accordingly, a need exists for an improved exhaust hanger and exhaust hanger assembly process for providing a robust exhaust hanger.

SUMMARY

This section provides a general summary of the disclosure, and is not a comprehensive disclosure of its full scope or all of its features.

In accordance with an aspect of the subject disclosure, an exhaust hanger assembly for a vehicle is provided. The exhaust hanger assembly includes a bracket, a clip, and a rod. The bracket includes a peripheral wall having a non-circular cross section. The bracket includes a first end configured to be fixed to an exhaust pipe of the vehicle and a second end including first and second receivers. The first receiver is formed in a front portion of the front wall and the second receiver is formed in a back portion of the back wall. The clip is disposed around at least a portion of an outer surface of the bracket and fixed to the bracket. The clip includes opposing apertures. The rod is configured to be fixed to a body of the vehicle. The rod extends through the opposing apertures of the clip and is fixed to the clip. The rod is disposed within the first and second receivers of the bracket.

In another aspect of the subject disclosure, an exhaust hanger assembly for a vehicle is provided. The exhaust hanger assembly includes a rod and clip subassembly and a bracket. The rod and clip subassembly includes a clip having opposing apertures and a rod extending through the opposing apertures of the clip and joined to the clip. The bracket includes a peripheral wall and opposing receivers formed in the peripheral wall. The opposing receivers are configured to receive to rod. The clip is configured to be disposed around and fixed to at least a portion of an outer surface of the peripheral wall of the bracket.

In still another aspect of the subject disclosure, a method of assembly an exhaust hanger assembly is provided. The method includes extending a rod through a clip. The clip is positioned around an outer surface of the bracket. The bracket has a first longitudinal axis, a peripheral wall, and opposing receivers in the peripheral wall. The rod is placed within the opposing receivers of the bracket. The clip is fixed to the bracket.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
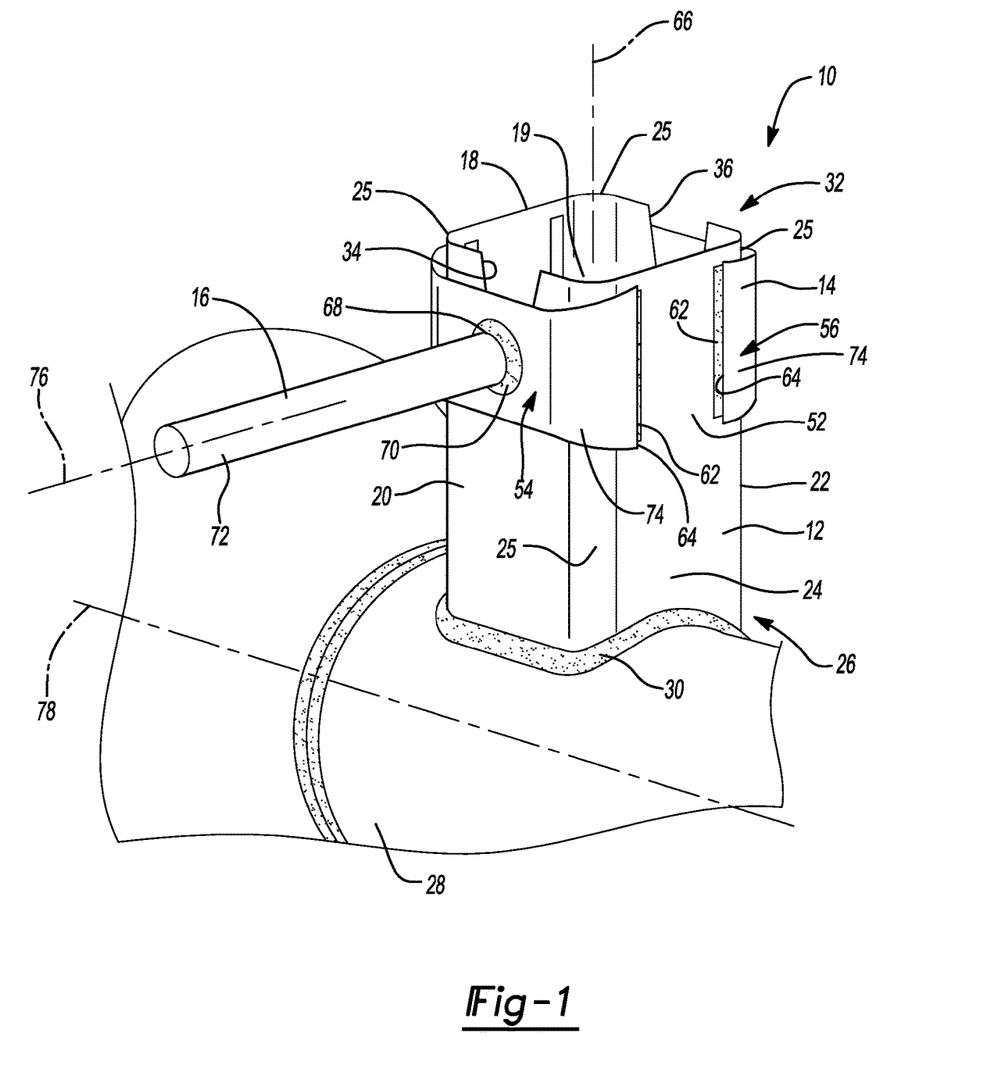
FIG. 1 is a partial perspective view of an exhaust hanger assembly constructed in accordance with the subject disclosure.

It should generally be appreciated that automotive exhaust hangers provide a means to attach an exhaust system to a vehicle body or frame. Several exhaust hangers may be distributed along the length of the exhaust, depending on the length and mass of the exhaust, to provide adequate support. With reference to FIG. 1, an example exhaust hanger assembly 10 according to the principles of the present disclosure is provided. The exhaust hanger assembly 10 generally includes a bracket 12, a clip 14, and a rod 16.

The bracket 12 includes a peripheral wall 18, which may be thin and may define a hollow interior 19. The peripheral wall 18 may have a polygonal cross section, such as a triangular, rectangular, or square cross section, by way of non-limiting example. The peripheral wall 18 may include a front portion which may be a front wall 20, a back portion which may be a back wall 22, and one or more side walls which may be opposing side walls 24. A peripheral wall having a square or box cross section has a desirably high stiffness to mass ratio. Each side wall 24 is adjacent to the front wall 20 and the back wall 22. The peripheral wall 18 may include rounded corners 25.

The bracket 12 may be a folded plate having single weld seam (not shown). The bracket 12 includes a first or bottom end 26 configured to be fixed to an exhaust pipe 28 of a vehicle. For example, the first end 26 of the bracket 12 may be fixed to the exhaust pipe 28 by a weld 30.

Figures 3, 4:
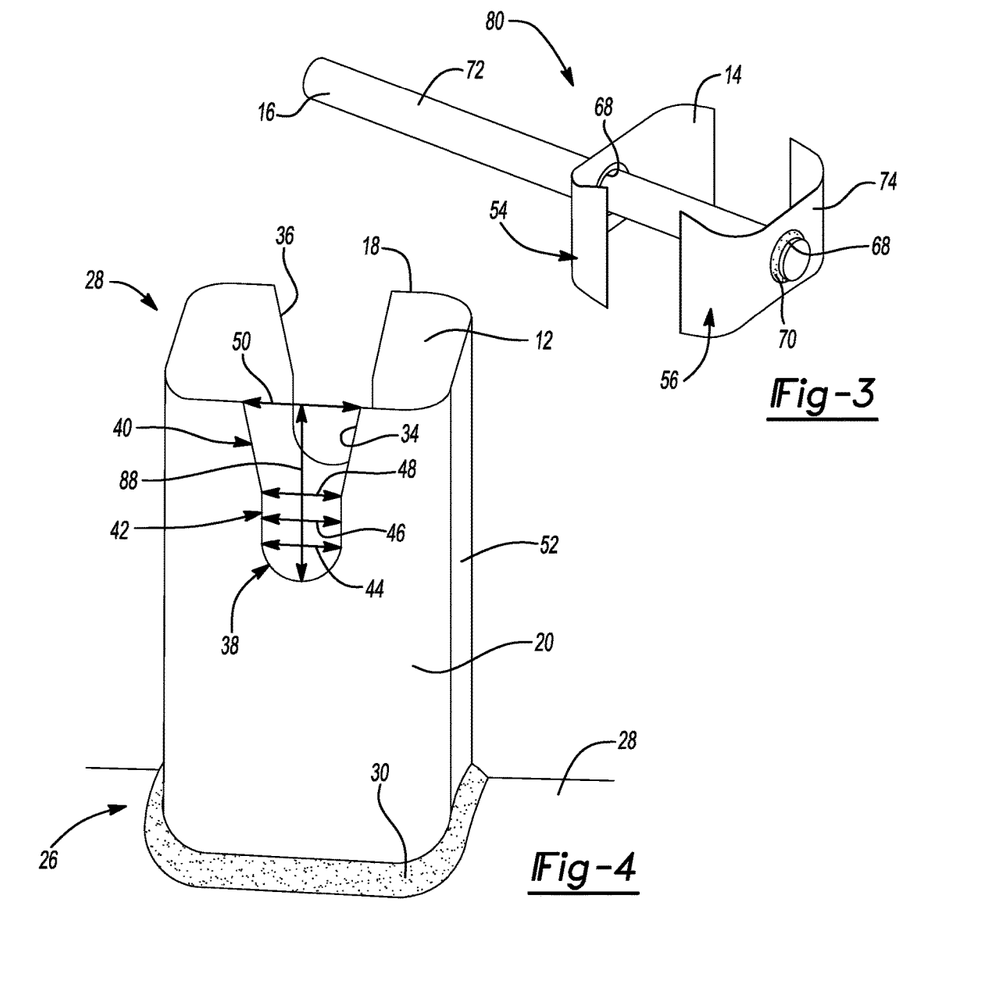
FIG. 3 shows a back perspective view of the rod and clip subassembly of FIG. 2.
FIG. 4 is a perspective view of a bracket of the exemplary exhaust hanger assembly of FIG. 1.

The bracket 12 further includes a second end 32. The second end 32 includes a first receiver 34 and a second receiver 36. The first and second receivers 34, 36 may be slots, as shown. In another example, the first and second receivers 34, 36 may be oversized (i.e., having a dimension greater than an outer diameter of the rod 16) apertures (not shown). The first receiver 34 may be formed in the front wall 20 and the second receiver 36 may be formed in the back wall 22. The first and second receivers 34, 36 may be disposed at centers of the front and back walls 20, 22, respectively. As best shown in FIG. 4, the first and second receivers 34, 36 may include a rounded portion 38, an angled portion 40, and a straight portion 42 disposed between the rounded portion 38 and the angled portion 40. The rounded portion 38 has a diameter 44. The straight portion 42 has a uniform width 46 that is equal to the diameter 44. The angled portion 40 increases from a first width 48 that is equal to the diameter 44 to a second width 50 greater than the first width 48. The second width may be greater than or equal to the first width. For example, the second width 50 may be greater than or equal to 1.2 times the first width 48 to less than or equal to 1.6 times the first width 48. The first and second receivers 34, 36 may comprise other geometries within the scope of the present disclosure. For example, the first and second receivers 34, 36 may comprise only a rounded portion 38 and a straight portion 42 (not shown).

Figure 2:
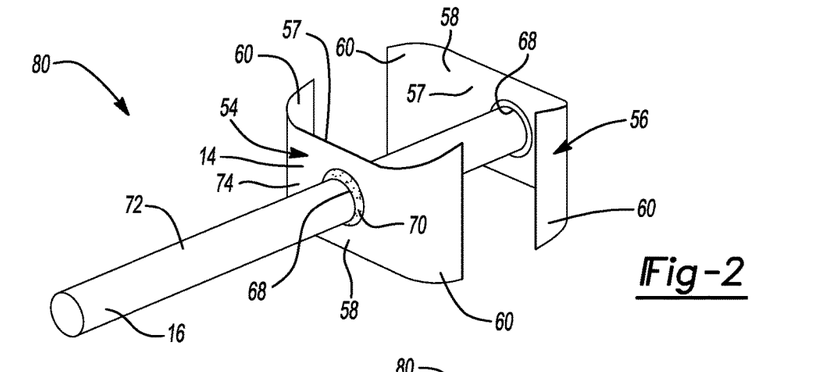
FIG. 2 shows a front perspective view of a rod and clip subassembly of the exemplary exhaust hanger assembly of FIG. 1.

The clip 14 may be disposed around at least a portion of an outer surface 52 of the bracket 12 and fixed to the bracket 12. The clip 14 may include a front portion 54 disposed around the front wall 20 and a back portion 56 disposed around the back wall 22. The clip 14 may include an inner surface 57 that is shaped to complement the outer surface 52 of the bracket 12. For example, when the peripheral wall has a rectangular cross section, each of the front and back portions 54, 56 of the clip 14 may be substantially U-shaped such that they include a base 58 and opposing arms 60 extending from opposite sides of the base 58, as best shown in FIGS. 2-3. Returning to FIG. 1, the respective bases 58 of the front and back portions 54, 56 of the clip 14 may be disposed parallel to the respective front and back walls 20, 22 of the bracket 12. The arms 60 of the clip 14 may wrap around the corners 25 of the bracket 12 and extend partially across the opposing side walls 24 of the bracket 12.

Figure 5:
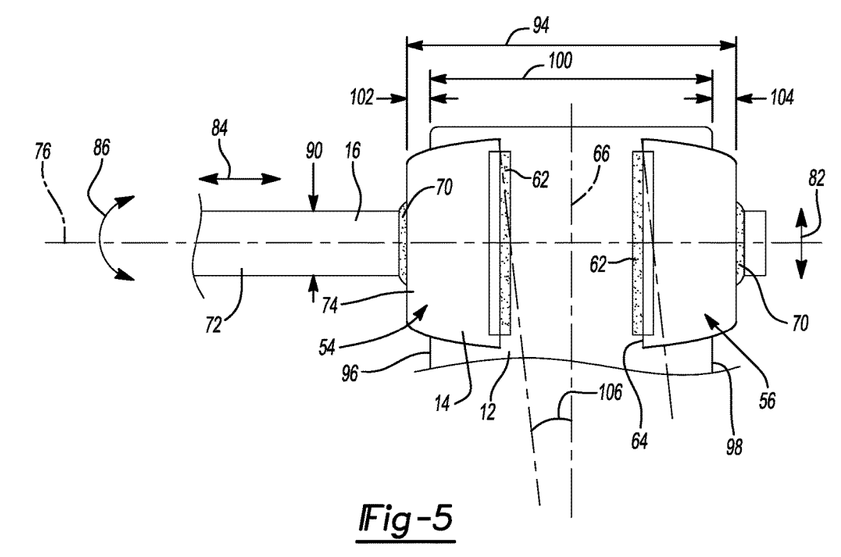
FIG. 5 is a side view of the exemplary exhaust hanger assembly shown in FIG. 1.
Figure 6:
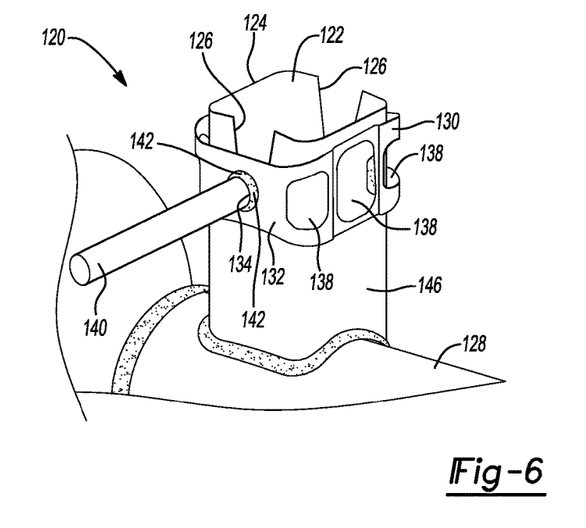
FIG. 6 is a partial perspective view of another exhaust hanger assembly constructed in accordance with the subject disclosure.
Figure 7:
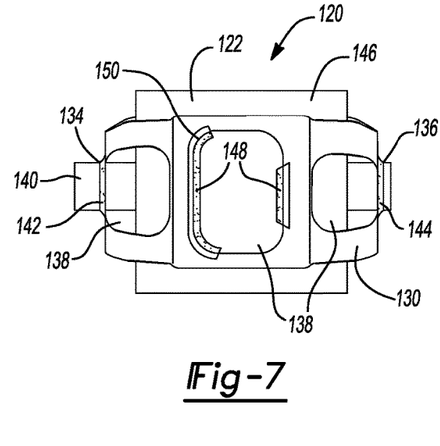
FIG. 7 is a first side view of the exemplary exhaust hanger assembly of FIG. 6.
Figure 8:
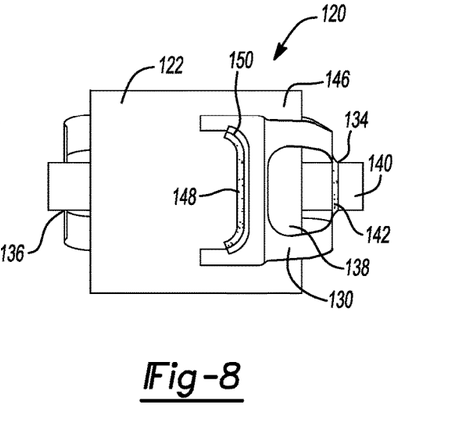
FIG. 8 is a second side view of the exemplary exhaust hanger assembly of FIG. 6.
Figures 9, 10:
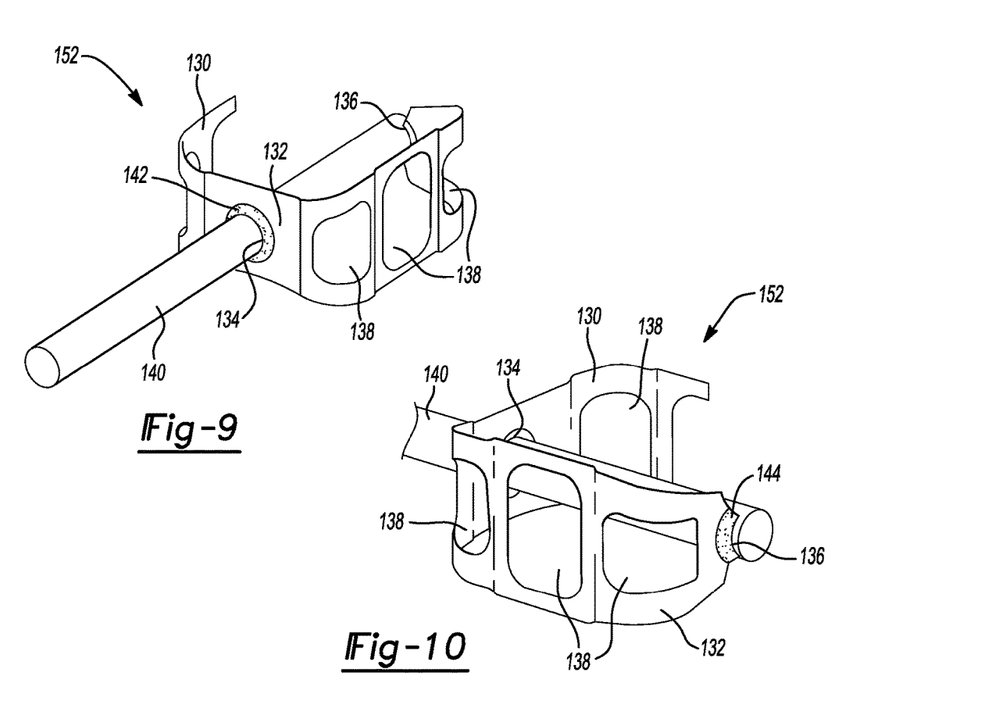
FIG. 9 is a front perspective view of a rod and clip subassembly of the exemplary exhaust hanger assembly of FIG. 6.
FIG. 10 shows a back perspective view of the rod and clip subassembly of FIG. 9.

The clip 14 may be fixed to the bracket 12 by a plurality of welds 62, as depicted in FIGS. 1 and 5. More specifically, the plurality may comprise four welds 62 and each weld 62 may join an edge 64 of the clip 14 to the outer surface 52 of the bracket 12. The plurality of welds 62 may be substantially vertical or parallel to a first longitudinal axis 66 of the bracket 12. Vertical welds are in the line of the applied load, thus, they exhibit a higher durability and a more uniform stress concentration when compared to horizontal welds, for example.

The rod 16 is configured to be fixed to a body of the vehicle (not shown). The rod 16 may be of solid construction, or it may have a hollow interior, depending on durability, frequency, and weight requirements of the exhaust hanger assembly 10. The rod 16 may extend through the first and second receivers 34, 36 of the bracket 12. Thus, the rod 16 may be disposed within the first and second receivers 34, 36. The rod 16 may also extend through opposing apertures 68 of the clip 14 so that it is supported by the clip 14 at the apertures 68. Thus, the rod 16 may have a two-point support.

The rod 16 may be joined to the clip by welds 70. The welds 70 may be 360° circular welds. More specifically, the welds 70 may join an outer surface 72 of the rod 16 to respective outer surfaces 74 of the front and back portions 54, 56 of the clip 14. By using welds 70 on two points of contact of the clip 14, strength for lateral loads and first mode frequency is improved as compared to a single point support. For example, the natural frequency of a two point support design may be increased by greater than or equal to about 200% compared to a single point support design.

The rod 16 may include a second longitudinal axis 76 and the exhaust pipe 28 may include a third longitudinal axis 78. Each of the first longitudinal axis 66, the second longitudinal axis 76, and the third longitudinal axis 78 may be substantially perpendicular to one another.

In other examples, the rod 16 and the clip 14 may be provided as a subassembly 80. The subassembly may be used with different rods and clips. That is, the rod and clip subassembly 80 may be used as a universal part.

Referring now to FIGS. 2-4, a method of assembling the exhaust hanger 10 of FIG. 1 is provided. A rod and clip subassembly 80 is shown in FIGS. 2-3. The rod and clip subassembly 80 includes the front and back portions 54, 56 of the clip 14 joined to the rod 16, as described above. Because the rod 16 and the clip 14 can be preassembled, the welds 70 can be readily formed as 360° circular welds. This is possible because the outer surface 72 of the rod 16 and the outer surface 74 of the clip 14 are accessible without interference of the exhaust pipe 28 or other vehicle components.

With reference to FIG. 4, the bracket 12 is shown joined to the exhaust pipe 28. Although the bracket 12 is shown joined to the exhaust pipe 28 prior to assembly with the rod and clip subassembly 80, the steps may be completed in a different order within the scope of the present disclosure. For example, the exhaust hanger assembly 10 may be joined to the exhaust pipe 28 after the rod and clip subassembly 80 is joined to the bracket.

The rod and clip subassembly 80 is placed into the first and second receivers 34, 36 of the bracket 12 so that the clip 14 at least partially surrounds the outer surface 52 of the bracket 12. The rod and clip subassembly 80 is then aligned, as described in greater detail below. After the rod and clip subassembly 80 is properly aligned, it is joined to the bracket 12, for example, by a welding, as described above. Although the rod 16 and the clip 14 are described as being preassembled, they may alternatively be joined together at a different point in the method. For example, the rod 16 may be joined to the clip 14 after insertion of the rod 16 in the first and second receivers 34, 36 and placement of the clip 14 or after alignment.

As best shown in FIG. 5, the rod and clip subassembly 80 can be adjusted in three directions during alignment, allowing considerable assembly freedom by accommodating assembly stack-up tolerances in a first direction 82 parallel to the first longitudinal axis, a second direction 84 parallel to the second longitudinal axis 76, and a third direction or tilt 86.

First, the subassembly 80 can be moved up and down within the first and second receivers 34, 36 to be adjusted in the first direction 82. The flexibility of assembly in the first direction 82 is enabled by the length of the first and second receivers 34, 36. For example, the first and second receivers 34, 36 may have a length 88 that is greater than a diameter 90 of the rod 16.

The subassembly 80 is also adjustable in the second direction 84. The opposing inner surfaces 57 of the clip 14 define a first dimension 94. The front and back wall 54, 56 include opposing outer surfaces 96, 98, respectively, that define a second dimension 100. The first dimension 94 may be greater than the second dimension 100. Thus, a first gap 102 is defined between the inner surface 57 of the clip 14 and the outer surface 96 of the bracket 12 and a second gap 104 is defined between the inner surface 57 of the clip and the outer surface 98 of the bracket. The difference in magnitude of the first and second gaps 102, 104 enables adjustment of the subassembly 80 in the second direction 84. The first and second gaps 102, 104 also allow the subassembly 80 to be paired with brackets 12 of different sizes.

Finally, the subassembly 80 can be tilted in the third direction 86 within the first and second receivers 34, 36. The degree of adjustment in the third direction is dependent on the length 88 of the first and second receivers 34, 36. A tilt angle 106 is formed between the first longitudinal axis 66 and one of the side edges 64 of the clip 14. The tilt angle 106 may be greater than or equal to about −−5° to less than or equal to about +5°. Because the tilt angle 106 is small, the welds 62 remain substantially vertical.

Referring now to FIGS. 6-10, another example exhaust hanger assembly 120 according to certain principles of the present disclosure is provided. The exhaust hanger assembly 120 includes a bracket 122 having a peripheral wall 124 and receivers 126, similar to the bracket 12 of the exhaust hanger 10 of FIG. 1. The bracket 122 is welded to an exhaust pipe 128 similar to the exhaust pipe 28 of FIG. 1.

The clip 130 comprises a single piece or unitary body 132. The clip 130 includes a first support 134, which may be a surface of an aperture, and a second support 136, which may be a surface of a semi-circular pocket. In other examples, the first and second supports 134, 136 may both be apertures. The unitary body 132 may include one or more weight reduction openings 138.

The exhaust hanger assembly 120 further includes a rod 140 similar to the rod 16 of the exhaust hanger assembly 10 of FIG. 1. The rod extends through the first and second supports 134, 136 of the clip 130 and is supported by the clip 130. Thus, the rod 140 uses the advantageous two-point support described above. The rod 140 is joined to the clip 130 by first and second welds 142, 144. The first weld 142 joins the rod 140 to the clip 130 at a location adjacent to the first support 134 of the clip. The first weld 142 may be a 360° circular weld. The second weld 144 joins the rod 140 to the clip 130 at the second support 136 of the clip. The second weld 144 may be a semi-circular weld. In some examples, the rod 140 and the clip 130 may be joined by a press-fit rather than welds (not shown).

The clip 130 is disposed at least partially around a surface 146 of the bracket 122. The rod 140 is disposed within the receivers 126 of the bracket 122. The clip 130 is joined to the bracket 122 by a plurality of welds 148. The welds 148 may be disposed adjacent to edges of the clip 130 or edges of the weight reduction openings 138. The welds 148 may be substantially vertical. In some examples, substantially vertical welds 148 extend at least partially around a corner 150 of the weight reduction opening 138 or clip 130.

The exhaust hanger assembly 120 can be assembled using a method similar to the method described in FIGS. 2-4 above. Specifically, a rod and clip subassembly 152 may be assembled first. The receivers 126 of the bracket 122 and dimensions of the bracket 122 and clip 130 enable adjustment and tolerance stack-up in three directions, as described above.

The exhaust hanger assemblies of FIGS. 1-10 may be light-weight and durable. First, the two-point support of the rod and clip subassembly enables use of the peripheral wall's stiffness. The vertical welds joining the clip to the bracket offer ample area to transfer the loads carried by the rod and clip to the bracket. For example, the reduction in stress due to the two-point support may be greater than or equal to about 75% as compared to a single-point support. Second, the weld lines joining the clip to the bracket are substantially vertical and are therefore aligned with the primary direction of loading. Thus, the weld orientation enables distribution of the shear loads from the primary direction of loading over a large area. The low stress concentration leads to high durability performance for a given load. In some examples, the low stress concentration enables the use of thin materials for a given stress, leading to a light-weight design and better fuel economy.

With reference to FIGS. 11-16, additional examples of exhaust assemblies according to certain principles of the present disclosure are provided. The exhaust assemblies of FIGS. 11-16 are light-weight. More specifically, each of the example exhaust assemblies includes a thin-walled exhaust pipe assembly having at least two exhaust pipe portions. Light weight exhaust assemblies are desirable to increase fuel economy of the vehicle. However, thin-walled exhaust pipes can be problematic due to high stress risers at joining end points and possible burn-through in the case of welded joints. The exhaust assemblies of the present disclosure include an overlap of the thin-walled pipes at the joining region to provide increased strength and thickness.

Figure 11:
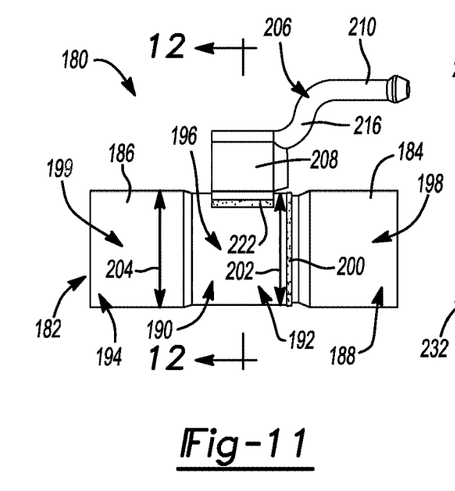
FIG. 11 is a side view of another exhaust hanger assembly constructed in accordance with the subject disclosure.
Figure 12:
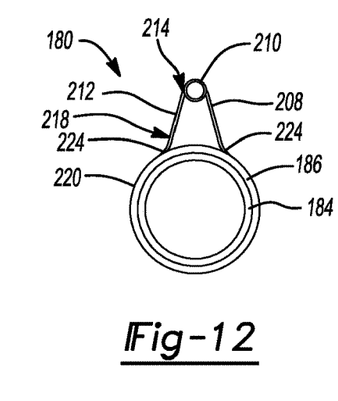
FIG. 12 is a front cross-sectional view of the exhaust hanger assembly of FIG. 11.

Referring to FIGS. 11-12, an example exhaust assembly 180 is provided in accordance with certain aspects of the present disclosure. The exhaust assembly 180 includes an exhaust pipe assembly 182 having a first portion 184 and a second portion 186. The first portion includes first and second ends 188, 190. The second portion 186 includes first and second ends 192, 194. The first portion 184 is at least partially disposed in the second portion 186 so that the second portion 186 overlaps the first portion 184 at a joining region 196. More specifically, the second end 190 of the first portion 184 is connected to the first end 192 of the second portion 186 so that the first and second portions 184, 186 are in fluid communication.

The joining region 196 is flanked by outer regions 198. Because of the overlap, a first total wall thickness at the joining region 196 is greater than second and third total wall thicknesses at the outer regions 198, 199 of the first and second portions 184, 186, respectively. By way of non-limiting-example, the first total wall thickness may be greater than or equal to about 0.8 mm to less than or equal to about 1.6 mm, optionally about 1.2 mm. The second and third total wall thicknesses may each be greater than or equal to about 0.4 mm to less than or equal to about 0.8 mm, optionally about 0.6 mm. The second and third wall thicknesses may be the same or different. In one example, the second total wall thickness is 0.6 mm and the third total wall thickness is 0.8 mm. In another example, the second and third total wall thicknesses are both 0.6 mm. The combined total wall thickness (i.e., the first total wall thickness at the joining region 196) enables a distribution of load and stress. Furthermore, it decreases the possibility of burn through during welding.

The first portion 184 of the exhaust pipe assembly 182 may be sealingly coupled to the second portion 186 of the exhaust pipe assembly 182 by a 360° weld 200 to prevent exhaust gas leakage. In other examples, the first portion 184 of the exhaust pipe assembly 182 may be sealingly connected to the second portion 186 of the exhaust pipe assembly 182 by brazing or other joining methods. An interference fit may be provided between the first portion 184 and the second portion 186 prior to further joining the first portion 184 to the second portion 186. The interference fit creates a stiffer member in the joining region 196.

The joining region 196 has a first outer diameter 202 and the outer regions 198 may have a second outer diameter 204 that is distinct from the first outer diameter 194. The first outer diameter 202 may be smaller than the second outer diameter 204. The smaller first outer diameter 202 may provide increased stiffness when compared to an exhaust pipe assembly having a uniform diameter.

The exhaust assembly 180 further includes a hanger 206. The hanger 206 includes a frame 208 and a wire 210. The frame 208 may have a triangular cross section comprising opposing legs 212. Each leg 212 may include a first edge 214 joined to an outer surface 220 of the wire 210 and a second edge 218 fixed to an outer surface 220 of the exhaust pipe assembly 182 at the joining region 196. The frame 208 may be fixed to the exhaust pipe assembly 182, for example, by horizontal welds 222. The second edges 214 may include feet 224.

Figure 13:
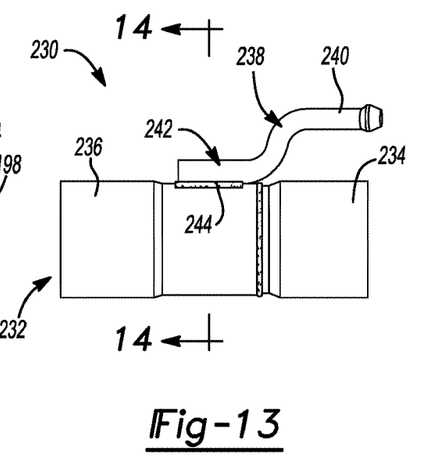
FIG. 13 is a side view of another exhaust hanger assembly constructed in accordance with the subject disclosure.
Figure 14:
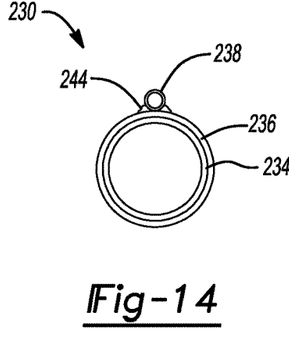
FIG. 14 is a front cross-sectional view of the exhaust hanger assembly of FIG. 13.

With reference to FIGS. 13-14, another example exhaust assembly 230 is provided. The exhaust assembly includes an exhaust pipe assembly 332 having first and second portions 234, 236 similar to the first and second portions 184, 186 of the exhaust pipe assembly 182 of the exhaust assembly 180 of FIGS. 11-12. The exhaust assembly 230 further includes a hanger 238 comprising a wire 240. The wire 240 has a straight region 242. The straight region 242 of the wire 240 is fixed to the exhaust pipe assembly 232 by horizontal welds 244.

Figure 15:
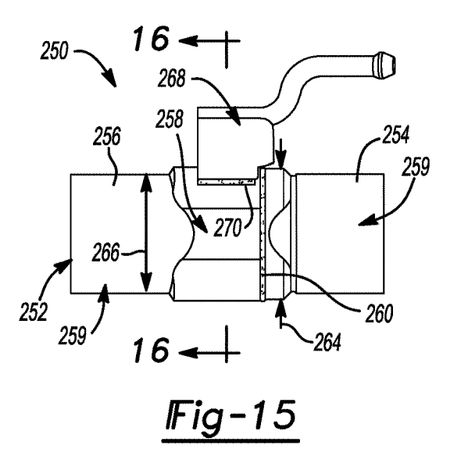
FIG. 15 is a side view of another exhaust hanger assembly constructed in accordance with the subject disclosure.
Figure 16:
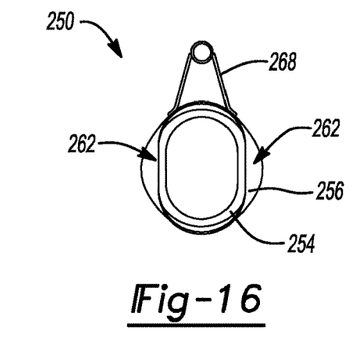
FIG. 16 is a front cross-sectional view of the exhaust hanger assembly of FIG. 15.

Referring now to FIGS. 15-16, another example exhaust assembly 250 according to certain aspects of the present disclosure is provided. The exhaust assembly 250 includes an exhaust pipe assembly 252 having a first portion 254 and a second portion 256. The first portion 254 is inserted into the second portion 256 so that the second portion 256 overlaps the first portion 254 at a joining region 258. The first and second portions 254, 256, may be sealingly coupled by a circular weld 260 or brazing (not shown).

One or both of the first and second portions 254, 256 may include formed wall regions 262 to provide extra stiffness. For example, the formed wall regions 262 may be thinner than surrounding regions, as shown, or the formed wall regions 262 may be thinner than surrounding regions. Moreover, the first and second portions 254, 256 may have non-circular cross sections for increased stiffness. For example, an outer surface of the first portion 254 and an inner surface of the second portion 256 may have oval-shaped cross sections. Other arrangements of formed wall regions 262 and cross sections are contemplated within the scope of the present disclosure.

The joining region 258 has a first outer diameter 264. The joining region is flanked by outer regions 259 having a second outer diameter 266. The first and second outer diameters 264, 266 may be distinct. For example, the first outer diameter 264 may be greater than the second outer diameter 266.

The exhaust assembly 250 further includes a hanger 268 similar to the hanger 206 of the exhaust assembly 180 of FIGS. 11-12. The hanger 268 may be fixed to the exhaust pipe assembly 252 by horizontal welds 270.

In certain aspects, the present disclosure provides a method of assembly an exhaust assembly. The method may be used to manufacture exhaust assemblies having distinct first and second outer diameters, such as exhaust assemblies 180, 230, 250 described above.

The method generally includes partially inserting an end of a first exhaust pipe component into an end of a second exhaust pipe component so that the second exhaust pipe component overlaps the first exhaust pipe component at a joining region. The method further includes creating a joining region having an outer diameter that is distinct from the outer regions. In one example, the second exhaust pipe component is reduced in diameter at the joining region to create an interference fit and a smaller outer diameter in the joining region than in the outer regions. In another example, the first exhaust pipe component is increased in diameter to create an interference fit and a larger outer diameter in the joining region than in the outer regions. In yet another example, the second exhaust pipe component is reduced in diameter and the first exhaust pipe component is increased in diameter at the joining region to create an interference fit.

After creating the interference fit, the first and second exhaust pipe components are mechanically sealed, for example by welding or brazing, to form an exhaust pipe component. A hanger, which may include a wire or a wire fixed to a frame or bracket, is attached to a surface of the joining region, for example, by welding.

EXAMPLE 1

Exhaust hanger assemblies according to certain aspects of the present disclosure, such as exhaust assemblies 180, 230, 250 may exhibit improved distribution of stress. More specifically, exhaust hanger assemblies of the present disclosure may distribute the high stress risers at the joining end points.

Assembly 1 is a control assembly. Assembly 1 includes a single-piece exhaust pipe having a substantially uniform 0.6 mm wall thickness. A hanger, similar to the hanger 206 of FIGS. 11-12, is attached to the single-piece exhaust pipe at the center section. The center section has a smaller outer diameter than outer regions surrounding the center section.

Assembly 2 is similar to the exhaust assembly 180 of FIGS. 11-12 in that it includes first and second exhaust pipe portions overlapping to form a joining region and having an interference fit. The pipes each have a 0.6 mm wall thickness. Thus, at a joining region, the total wall thickness is about 1.2 mm. The first and second exhaust pipe sections are sealingly coupled by a 360° weld. The joining region includes a smaller outer diameter than the surrounding outer regions. Assembly 2 includes an attached hanger similar to the hanger 206 of FIGS. 11-12.

Assembly 3 includes first and second exhaust pipe portions overlapping to form a joining regions and having a slip fit. Assembly 3 is otherwise similar to the exhaust assembly 180 of FIGS. 11-12. The pipes each have a 0.6 mm wall thickness. More specifically, there is a 0.7 mm gap between an outer surface of the second portion and an inner surface of the first portion. The first and second exhaust pipe portions are sealingly coupled by a 360° weld. The joining region includes a smaller outer diameter than the surrounding outer regions. Assembly 3 includes an attached hanger similar to the hanger 206 of FIGS. 11-12.

The hangers of Assemblies 1, 2, and 3 are constructed from 409 stainless steel. Assemblies 1, 2, and 3 each include exhaust pipes or exhaust pipe portions having a 57.15 mm outer diameter prior to decreasing the diameter at the joining region. The exhaust pipes or exhaust pipe portions are also constructed from 409 stainless steel. In assemblies 2 and 3, the joining region extends 20 mm on each of the first and second exhaust pipe portions, which are joined by a 360° weld having a 3 mm fillet.

Figure 17:
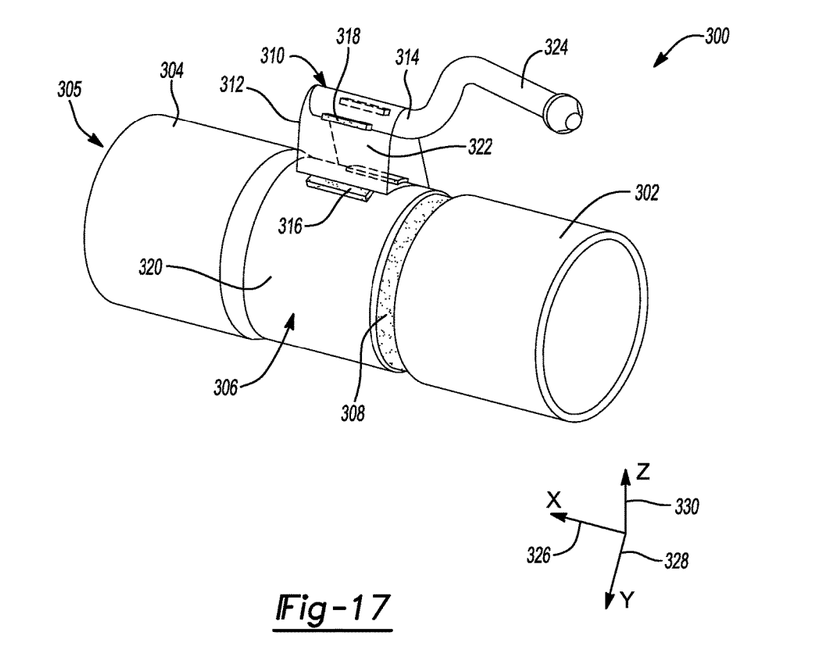
FIG. 17 is a perspective view of an exemplary exhaust hanger assembly showing stress regions constructed in accordance with the subject disclosure.

Referring now to FIG. 17, an exhaust assembly 300 similar to the exhaust assembly 180 of FIGS. 11-12 is shown. The exhaust assembly 300 generally includes first and second exhaust pipe portions 302, 304 to form an exhaust pipe assembly 305, a joining region 306, and a 360° weld 308 sealingly coupling the first and second exhaust pipe portions 302, 304. The exhaust assembly 300 also includes an attached hanger 310 comprising a frame 312 and a wire 314. The frame 312 of the hanger 310 is joined to the exhaust pipe assembly 305 at the joining region 306 by welds 316.

In the experiment, stress is measured at 6 locations. Location 1 is the weld 316 that attaches the frame 312 of the hanger 310 to the joining region 306 of the exhaust pipe assembly 305. Location 2 is a weld 318 attaching the wire 314 to the frame 312. Location 3 is the 360° weld 308 sealingly coupling the first and second exhaust pipe portions 302, 304. Location 4 is a base material 320 at the joining region 306 of the exhaust pipe assembly 305. Location 305 is a base material 322 of the frame 312 of the hanger 310. Location 6 is a base material 324 of the wire 312. The x-axis is shown at 326, the y-axis is shown at 328, and the z-axis is shown at 330.

Figure 18:
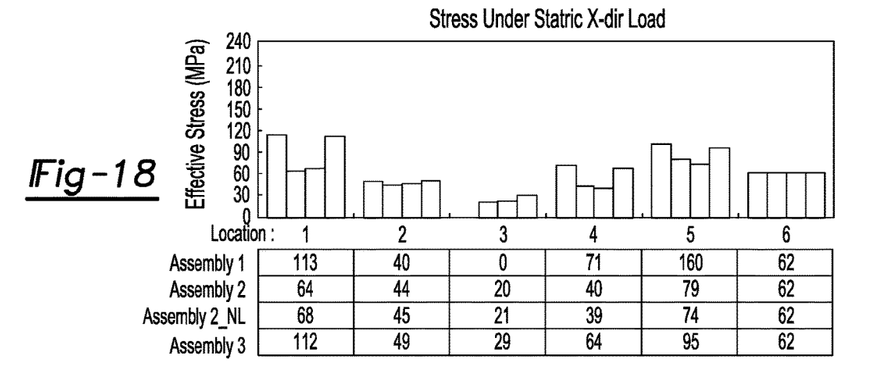
FIG. 18 shows stress testing results for an exhaust hanger assembly having a unitary exhaust pipe.
Figure 19:
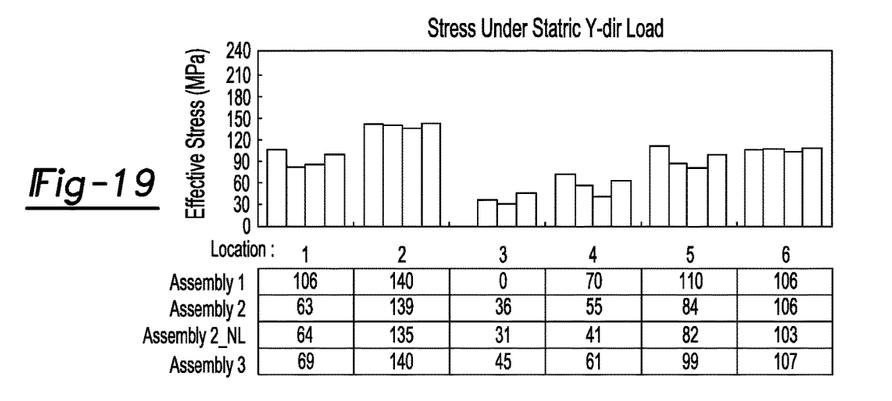
FIG. 19 shows stress testing results for an exhaust hanger assembly having first and second exhaust pipe portions connected by an interference fit.
Figure 20:
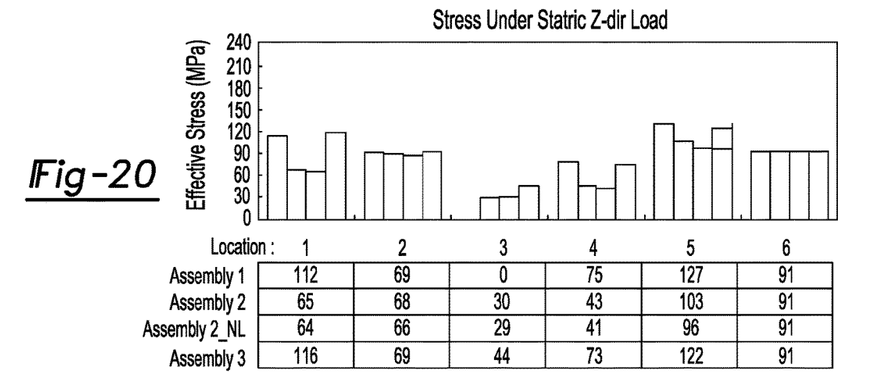
FIG. 20 shows stress testing results for an exhaust hanger assembly having first and second exhaust pipe portions connected by a slip fit.

With reference to FIGS. 18-20, effective stress in MPa is shown at each of Locations 1-6 for each of Assemblies 1-3. Assembly 2 is analyzed in two ways, first under linear finite element analysis (FEA), then under non-linear FEA to account for the stiffness from the interference sizing between first and second exhaust pipe portions. Assemblies 1 and 3 are each analyzed under linear FEA. The linear FEA analyses are indicated as "Assembly 1," "Assembly 2," and "Assembly 3," respectively in FIGS. 18-20. The non-linear FEA of Assembly 2 is labeled "Assembly 2_NL" in FIGS. 18-20.

FIG. 18 shows stress under static x-direction loading, FIG. 19 shows stress under static y-direction loading, and FIG. 20 shows stress under static z-direction loading. The analysis shows that with loading input in the x-, y-, and z-directions, at Location 1 in each of the Assemblies 1-3, the stress is distributed in this area. Generally, stress is lowest in Assembly 2 for each direction of loading and at each of Locations 1-6.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust hanger assembly for a vehicle comprising:
a bracket comprising a peripheral wall having a non-circular cross section, the bracket including a first end configured to be fixed to an exhaust pipe of the vehicle and a second end including first and second receivers, wherein the first receiver is formed in a front portion of the peripheral wall and the second receiver is formed in a back portion of the peripheral wall;
a clip disposed around at least a portion of an outer surface of the bracket and fixed to the bracket, the clip comprising opposing apertures; and
a rod configured to be fixed to a body of the vehicle, the rod extending through the opposing apertures of the clip and fixed to the clip, wherein the rod is disposed within the first and second receivers of the bracket.

2. The exhaust hanger assembly of claim 1, wherein:
the rod includes a first longitudinal axis and the exhaust pipe includes a second longitudinal axis, the first longitudinal axis being substantially perpendicular to the second longitudinal axis.

3. The exhaust hanger assembly of claim 1, further comprising first and second welds, wherein the first and second welds join an outer surface of the rod to respective clip surfaces adjacent to the opposing apertures.

4. The exhaust hanger assembly of claim 1, further comprising a plurality of vertical welds extending substantially vertically relative to a surface along which the vehicle is adapted to travel, wherein each vertical weld is disposed adjacent to an outer surface of the bracket and an edge of the clip.

5. The exhaust hanger assembly of claim 4, wherein the plurality of substantially vertical welds comprises four welds and each weld is disposed on the peripheral wall of the bracket.

6. The exhaust hanger assembly of claim 1, wherein the clip includes a front portion at least partially disposed around the front portion of the peripheral wall of the bracket and a back portion at least partially disposed around the back portion of the peripheral wall of the bracket.

7. The exhaust hanger assembly of claim 6, further comprising:
a first gap disposed between the front portion of the peripheral wall of the bracket and the front portion of the clip; and
a second gap disposed between the back portion of the peripheral wall of the bracket and the back portion of the clip.

8. The exhaust hanger assembly of claim 1, wherein the bracket has a polygonal cross section and an outer surface and the clip has an inner surface that complements the outer surface of the bracket.

9. The exhaust hanger assembly of claim 8, wherein the bracket has a rectangular cross section.

10. The exhaust hanger assembly of claim 1, wherein the clip comprises a unitary structure.

11. The exhaust hanger assembly of claim 10, wherein a press fit is provided between an outer surface of the rod and respective inner surfaces of the opposing apertures.

12. The exhaust hanger assembly of claim 10, wherein the unitary structure of the clip includes one or more weight reduction openings.

13. An exhaust hanger assembly for a vehicle comprising:
a rod and clip subassembly comprising a clip comprising opposing apertures and a rod extending through the opposing apertures of the clip and joined to the clip, wherein the rod is configured to be fixed to a body of the vehicle; and
a bracket comprising a peripheral wall and opposing receivers formed in the peripheral wall, wherein the opposing receivers are configured to receive the rod, and wherein the clip is configured to be disposed around and fixed to at least a portion of an outer surface of the peripheral wall of the bracket.

14. The exhaust hanger assembly of claim 13, wherein the bracket comprises a longitudinal axis and the rod is configured move in a direction parallel to the longitudinal axis within the opposing receivers during assembly so that the rod and clip subassembly is configured to be adjustable in a direction parallel to the longitudinal axis during assembly.

15. The exhaust hanger assembly of claim 13, wherein the rod includes a longitudinal axis and the clip comprises opposing inner surfaces defining a first dimension, the peripheral wall of the bracket includes opposing outer surfaces defining a second dimension, and the first dimension is greater than the second dimension so that the rod and clip subassembly is configured to be adjustable in a direction parallel to the longitudinal axis during assembly prior to being fixed to the bracket.

16. The exhaust hanger assembly of claim 13, wherein a longitudinal axis of the bracket and a side edge of the clip form a tilt angle greater than or equal to $-5°$ and less than or equal to $+5°$.

17. A method of assembling an exhaust hanger assembly for a vehicle comprising:
extending a rod through a clip to define a subassembly, wherein the rod is configured to be fixed to a body of the vehicle;
positioning the clip around an outer surface of a bracket having a first longitudinal axis, a peripheral wall, and opposing receivers in the peripheral wall;
placing the rod within the opposing receivers of the bracket;
fixing the rod to the clip; and
fixing the clip to the bracket.

18. The method of claim 17, further comprising:
prior to the fixing the clip to the bracket, adjusting a placement of the subassembly in a first direction by moving the rod within the opposing receivers in a direction parallel to the first longitudinal axis;
adjusting the placement of the subassembly in a second direction by moving the subassembly in a direction parallel to a second longitudinal axis of the rod; and
adjusting a tilt angle between the first longitudinal axis a side edge of the clip.

19. The method of claim 17, wherein the method comprises extending the rod through the clip and fixing the rod to the clip prior to positioning the clip around the outer surface of the bracket.

20. The method of claim 17, further comprising:
prior to defining the subassembly, inserting the rod in opposing apertures of the clip and forming respective circular welds between an outer surface of the rod and respective surfaces of the clip adjacent to the opposing apertures.

* * * * *